United States Patent [19]

Honda

[11] Patent Number: 5,231,875
[45] Date of Patent: Aug. 3, 1993

[54] METHOD AND APPARATUS FOR EVALUATING GEAR MOTION CHARACTERISTICS, BASED ON TOOTH PROFILE DEFLECTION DIFFERENTIATED BY ROTATION ANGLE OF THE GEAR

[75] Inventor: Sho Honda, Aichi, Japan

[73] Assignee: Toyota Jidosha Kabushiki Kaisha, Toyota, Japan

[21] Appl. No.: 857,586

[22] Filed: Mar. 25, 1992

[30] Foreign Application Priority Data

Apr. 22, 1991 [JP] Japan ................................ 3-117993
Oct. 11, 1991 [JP] Japan ................................ 3-292091

[51] Int. Cl.⁵ .................................................. G01M 13/02
[52] U.S. Cl. ........................................ 73/162; 364/551.02; 33/501.9; 33/501.13; 33/501.8; 33/501.7
[58] Field of Search ............. 73/162; 33/501.7, 501.8, 33/501.9, 501.13; 364/551.02

[56] References Cited

U.S. PATENT DOCUMENTS

| | | | |
|---|---|---|---|
| 3,693,431 | 9/1972 | King | 73/162 |
| 3,882,720 | 5/1975 | Fabish | 73/162 |
| 4,020,678 | 5/1977 | Laue | 73/162 |
| 4,336,711 | 6/1982 | Maehara et al. | 73/162 |
| 4,488,359 | 12/1984 | Misson | 33/501.8 |
| 4,519,241 | 5/1985 | Hofler | 73/162 |

FOREIGN PATENT DOCUMENTS

| | | | |
|---|---|---|---|
| 48-93359 | 12/1973 | Japan . | |
| 53-102777 | 9/1978 | Japan . | |
| 53-113652 | 10/1978 | Japan . | |
| 0069531 | 6/1981 | Japan | 73/162 |
| 57-23835 | 2/1982 | Japan . | |
| 0832321 | 5/1981 | U.S.S.R. | 73/162 |

OTHER PUBLICATIONS

"Gears", vol. 2, Chapter 2, 6th edition "Evaluation of the Motion Characteristics of a Spur Gear", Oct. 1, 1966, pp. 343-359.
"Rotational Vibration of a Helical Gear Pair with Modified Tooth Surfaces" author: Sho Honda. This paper is included in Transactions of the Japan Society of Mechanical Engineers, Nov. 1991, vol. 57, No. 543.
Gear Technology vol. 1, No. 1, Jun. 1984, Elk Grove, Ill. USA.

Primary Examiner—Thomas B. Will
Assistant Examiner—Diego F. F. Gutierrez
Attorney, Agent, or Firm—Finnegan, Henderson, Farabow, Garrett and Dunner

[57] ABSTRACT

A method of evaluating motion characteristics of a workpiece gear, wherein the amount of tooth profile deflection of the workpiece gear in a direction substantially perpendicular to a surface of each tooth of the gear is obtained in relation to an angle of rotation of the gear, and a differentiated value of the amount of tooth profile deflection is obtained by differentiating the amount of tooth profile deflection by the angle of rotation. The motion characteristics of the gear are evaluated based on the differentiated value. Also disclosed in an apparatus for practicing the method.

28 Claims, 6 Drawing Sheets

METHOD AND APPARATUS FOR EVALUATING GEAR MOTION CHARACTERISTICS, BASED ON TOOTH PROFILE DEFLECTION DIFFERENTIATED BY ROTATION ANGLE OF THE GEAR

BACKGROUND OF THE INVENTION

1. Field of the Invention

The present invention relates to a method and an apparatus for evaluating motion characteristics of a gear based on tooth profile deflection of the gear.

2. Discussion of the Prior Art

One example of a method of obtaining an amount of tooth profile deflection of a gear in the direction perpendicular to each tooth surface is disclosed in an article, pages 345-354, "GEARS", vol. 2, 6th edition, Oct. 1, 1966, Nikkan Kogyo Shinbunsha, Tokyo. The method disclosed in this article will be briefly described referring to FIG. 5.

An involute spur gear to be evaluated (hereinafter referred to as "workpiece gear") is fixed to a base circle disk 10 such that the workpiece gear and the disk 10 are coaxial with each other. The disk 10 has a diameter which is equal to that of an ideal base circle of the workpiece gear. A straightedge bar 20 having a flat side surface or straightedge 18 is supported so as to be freely movable substantially along the flat side surface 18, such that the flat side surface 18 is held in rolling contact with a cylindrical surface of the base circle disk 10. On the straightedge bar 20, there is supported a pivotal arm 23 having a contact element in the form of a contact ball 24 such that the arm 23 is pivotable about its fixed end, so that the contact element 24 at the free end of the arm 23 is freely movable in a direction substantially parallel to the flat surface 18, as long as the contact element 24 is located near the flat surface 18, that is, as long as the angle of pivotal movement of the arm 23 is sufficiently small. The base circle disk 10 and the straightedge bar 20 are arranged so that the the straightedge bar 20 is movable with its flat side surface 18 in rolling contact with the cylindrical surface of the disk 10, without slipping of the flat surface 18 on the cylindrical surface of the disk 10. During a rotary movement of the workpiece gear together with the disk 10, the the ball 24 is kept in contact with a tooth surface of the workpiece gear, whereby the contact ball 24 describes or follows a tooth profile curve 26. If the workpiece gear had no tooth profile deflection, the tooth profile curve 26 would be an involute profile. If the workpiece gear has a certain amount of tooth profile deflection, the path of movement of the contact ball 24 deviates away from the involute curve in the direction of movement of the straightedge bar 20. Accordingly, the amount of deviation of the contact ball 24 from the involute curve represents the amount of the tooth profile deflection of the workpiece gear.

Conventionally, the motion characteristics (e.g., vibration characteristic and dynamic load characteristic) of the workpiece gear are evaluated based on the tooth profile deflection obtained as described above. However, since there is not a definite relationship between the amount of tooth profile deflection and the motion characteristics of the workpiece gear, the evaluation of the motion characteristics based on the obtained tooth profile deflection inevitably depends on experience and guesswork of the evaluator. Consequently, the accuracy of the evaluation is limited.

In view of the situation in the prior art discussed above, the inventor has made a research in an effort to find out parameters by which the motion characteristics of the workpiece gear can be accurately evaluated. As a result, the inventor discovered a fact that an amount of variation in the load (hereinafter referred to as "load variation") which acts on the surface of each tooth of a pair of gears during rotation thereof in mesh with each other is largely affected by an error in the base circle radius (hereinafter referred to as "base circle radius error") of the workpiece gear. The base circle radius error is interpreted to mean an amount of deviation of the radius of the instantaneous base circle (which will be described) from the radius of the base circle as generally defined in the field of gear generation or gear geometry. There will be described a relationship between the load variation and the base circle radius error, which has been found on a pair of involute helical gears rotating in a single-flank meshing fashion, by way of example.

To begin with, it is assumed that one of the pair of involute helical gears which is positively driven is a driving gear having no tooth profile deflection, while the other gear is a driven gear which is driven by the driving gear and which has a certain amount of tooth profile deflection. In other words, it is assumed that the driven gear has a resultant value of the actual tooth profile deflections of the driving and driven gears. Further, the pair of involute helical gears are converted into an equivalent pair of involute spur gears, which has the same rotary motion as the helical gear pair. The spur gear equivalent to the driving involute helical gear having no tooth profile deflection is named a first gear, while the other spur gear equivalent to the driven involute helical gear having tooth profile deflection is named a second gear. The present inventor found that the load variation $Fd(\theta_2)$ can be represented by the following equation:

$$Fd(\theta_2) = M \cdot [T_2 \cdot \Delta Rb(\theta_2)/J_2 - \Delta Rb'(\theta_2) \cdot \omega_{20}^2]$$

where, $M = J_1 \cdot J_2 / [Rb_{10}^2 \cdot [i^2 \cdot J_1 + J_2]]$, $J_1$: moment of inertia of the first gear, $J_2$: moment of inertia of the second gear, $Rb_{10}$: radius of ideal base circle of the first gear, $i$: gear ratio, $T_2$: torque transmitted to the second gear, $\theta_2$: angle of rotation of the second gear when the first gear is rotated by $\theta_1$, $\Delta Rb(\theta_2)$: base circle radius error of the second gear, $\Delta Rb'(\theta_2)$: differentiated value of $\Delta Rb(\theta_2)$ obtained by differentiating $\Delta Rb(\theta_2)$ by the angle $\theta_2$ of rotation of the second gear, $\omega_{20}$: mean angular velocity of the second gear.

The process in which the above equation was obtained is described in detail in the inventor's report entitled "Rotational vibration of a helical gear pair with modified tooth surfaces", which was delivered at the 69 th national conference held on Oct. 16, 1991 by the Japan Society of Mechanical Engineers. The report is included in "TRANSACTIONS OF THE JAPAN SOCIETY OF MECHANICAL ENGINEERS", Nov. 1991, Vol. 57, No. 543.

In essence, the load variation Fd of an involute helical gear largely depends on the base circle radius error $\Delta Rb(\theta_2)$ when the involute helical gear is rotating at a relatively low velocity under a relatively large load, and largely on the differentiated value $\Delta Rb'(\theta_2)$ when the gear is rotating at a relatively high speed under a relatively small load. Therefore, the motion characteristics of the involute helical gear can be accurately evaluated by obtaining the base circle radius error $\Delta Rb(\theta_2)$ and its differentiated value $\Delta Rb'(\theta_2)$.

SUMMARY OF THE INVENTION

The present invention was developed in the light of the above finding. It is therefore a first object of the invention to provide a method of accurately evaluating motion characteristics of a gear based on tooth profile deflection of the gear.

A second object of this invention is to provide an apparatus suitable for practicing the method indicated above.

The first object may be attained according to a first aspect of this invention, which provides a method of evaluating motion characteristics of a workpiece gear, the method comprising the steps of: obtaining an amount of tooth profile deflection of the workpiece gear in a direction substantially perpendicular to a surface of each tooth of the workpiece gear, in relation to an angle of rotation of the workpiece gear; obtaining a differentiated value of the amount of tooth profile deflection, by differentiating the amount of tooth profile deflection by the angle of rotation; and evaluating the motion characteristics of the workpiece gear, based on the differentiated value.

The differentiated value of the amount of tooth profile deflection may be a first derivative and/or a second derivative of the amount of tooth profile deflection with respect to the angle of rotation.

Referring to FIG. 1, an example of a tooth profile of an equivalent spur gear as defined above is shown. The tooth profile is represented by tangential-polar coordinates, with an angle $\theta$ of rotation of the gear as a parameter, and with a distance $q(\theta)$ and a radius $Rb(\theta)$ as variables. The distance $q(\theta)$ is a distance between a line L tangent to the tooth profile and the center 0 of the gear. The radius $Rb(\theta)$ is a radius of an instantaneous base circle C of the gear. The instantaneous base circle is a circle whose center is at the center 0 of the gear, and whose radius $Rb(\theta)$ is determined by a normal with respect to the tooth profile, at every instantaneous point on the tooth profile. When the gear is rotated in mesh with another gear, the line tangent to the instantaneous base circle is the line of action representative of the direction of forces acting on the meshing teeth of the meshing gears. In FIG. 1, $L_0$ represents a tangent to the tooth profile at point P, $q_0$ represents a distance between the center 0 and the tangent $L_0$, and $C_0$ represents the instantaneous base circle, where the rotation angle $\theta$ of the gear is zero (0).

When the gear is rotated through the angle 0 in the counterclockwise direction as seen in FIG. 1, the tangent to the tooth profile is shifted from $L_0$ to L, and the contact point on the tooth profile with respect to its tangent is shifted from P to T. Further, the distance between the tooth profile tangent and the center 0 is changed from $q_0$ to $q(\theta)$, and the instantaneous base circle is changed from $C_0$ to C. The distance $q(\theta)$ can be approximated as $q_0 + Rb_0 \cdot \theta + \Delta p(\theta)$, where $Rb_0$ represents the radius of an ideal base circle of the gear, while $\Delta p(\theta)$ represents the amount of tooth profile deflection, which is a deflection of the tooth profile from the involute curve. The graph of FIG. 2 shows an example of the tooth profile deflection. In the graph, the tooth profile is indicated in solid line while the involute curve is indicated in dashed line.

If the workpiece gear is further rotated counterclockwise by an infinitesimal angle $\Delta\theta$, as shown in FIG. 3, the instantaneous base circle is changed from C to C', and the tangent to the instantaneous base circle (base circle tangent) is shifted from U to U'. Further, the intersection point on the tooth profile with respect to the base circle tangent is shifted from T to T', and the distance between the intersection point and the center O of the gear in the direction of the base circle tangent is changed from $q(\theta)$ to $q(\theta+\Delta\theta)$, i.e., to $q(\theta)+\Delta q$. Since the angle $\Delta\theta$ of rotation is infinitesimal, the radii $Rb(\theta+\Delta\theta)$ and $Rb(\theta)$ of the instantaneous base circle can be considered almost equal to each other, and the base circle tangents U and U' can be considered almost parallel to each other, whereby the value $\Delta q$ can be approximated as $Rb(\theta) \cdot \Delta\theta$. Therefore, the instantaneous base circle radius $Rb(\theta)$ can be expressed as $dq/d\theta$.

According to the equation $Rb(\theta) = dq/d\theta$, and an equation $q(\theta) = q_0 + Rb_0 \cdot \theta + \Delta p(\theta)$, the instantaneous base circle radius $Rb(\theta)$ can be expressed as $Rb_0 + d(\Delta p(\theta))/d\theta$. That is, the deviation of the radius of the instantaneous base circle from that of the ideal base circle with the rotation angle $\theta$ is equal to $d(\Delta p(\theta))/d\theta$, which is obtained by differentiating the tooth profile deflection $\Delta p$ by the rotation angle $\theta$. This deviation amount $d(\Delta p(\theta))/d\theta$ is called base circle radius error $\Delta Rb$. An example of the base circle radius error $\Delta Rb$ is indicated in the graph of FIG. 4.

Where the principle of the present invention is practiced on an involute gear, the base circle radius error $\Delta Rb$ is one form of the differentiated value of the tooth profile deflection $\Delta p$. Further, since there is a known relationship between the base circle radius error $\Delta Rb$ and the load variation Fd, as represented by the equation given above, the motion characteristics of the involute gear can be accurately evaluated based on the base circle radius error $\Delta Rb$.

The motion characteristics of the gear can also be evaluated based on the load variation Fd calculated according to the above equation, by inserting the specific values for the parameters in the equation.

The principle of this invention is applicable to other types of gears, such as cylindrical gears, bevel gears and hypoid gears, whose tooth profiles are not involute profiles, since the above-identified equation $Rb(\theta) = dq/d\theta$ is fundamentally applicable to such other types of gears. More specifically, the common normal to the two tooth profile curves of a pair of meshing gears at an instantaneous point of contact is tangent to an instantaneous base circle (cylinder) whose center lies on the axis of rotation of one of the gears, and the tooth profile deflection in the direction of the normal at the point of contact depends on the instantaneous base circle indicated above.

It will be understood from the foregoing summary of the invention that the motion characteristics of a gear can be accurately evaluated based on the differentiated value of the tooth profile deflection obtained according to the present invention.

BRIEF DESCRIPTION OF THE DRAWINGS

The above and optional objects, features and advantages of the present invention will better understood by reading the following detailed description of presently preferred embodiments of the invention, when considered in connection with the accompanying drawings, in which.

DETAILED DESCRIPTION OF THE PREFERRED EMBODIMENTS

Figure 1:
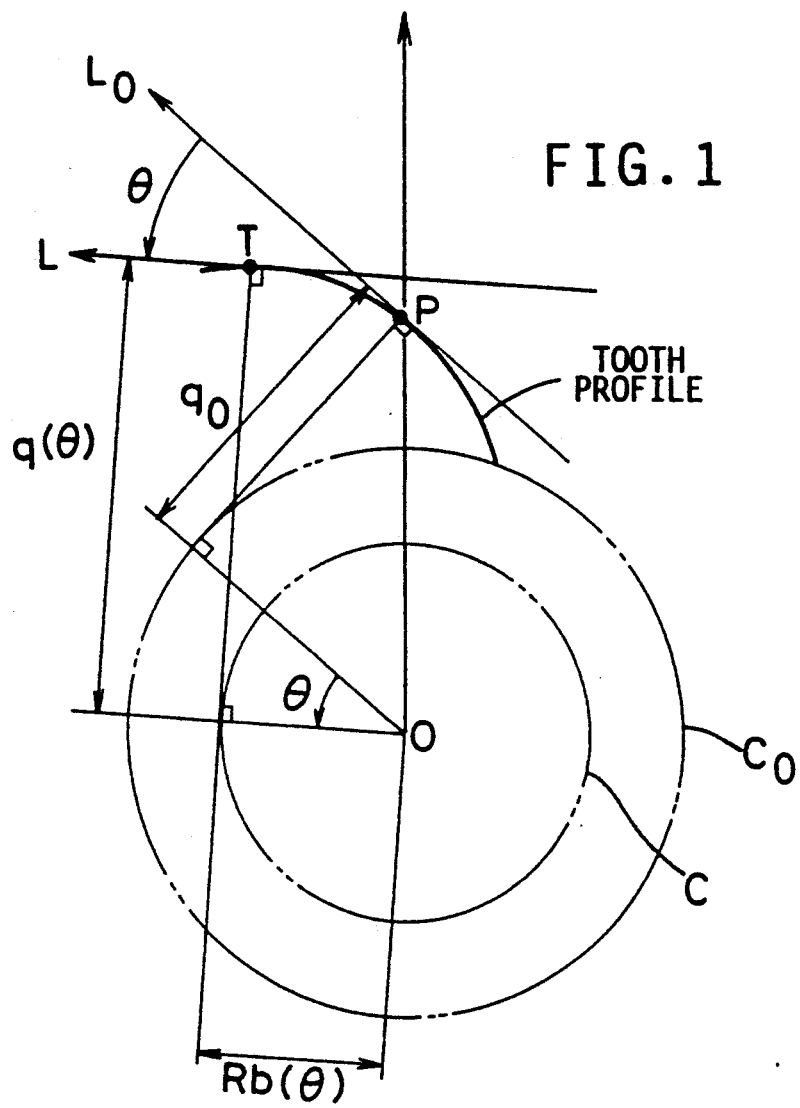
FIG. 1 is a view for explaining the principle of a method of evaluating motion characteristics of a gear according to the present invention.
Figure 2:
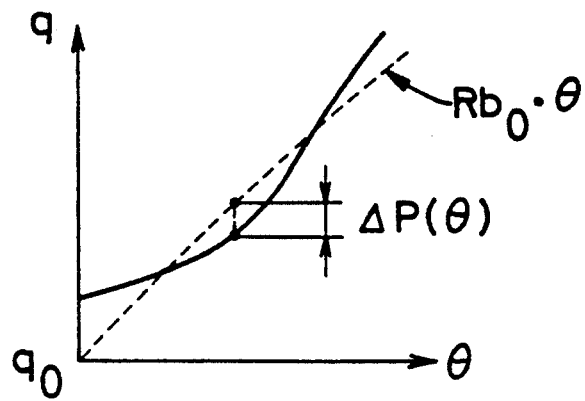
FIG. 2 is a graph indicating an example of a tooth deflection $\Delta p(\theta)$ of a gear, which is obtained according to the present invention.
Figure 3:
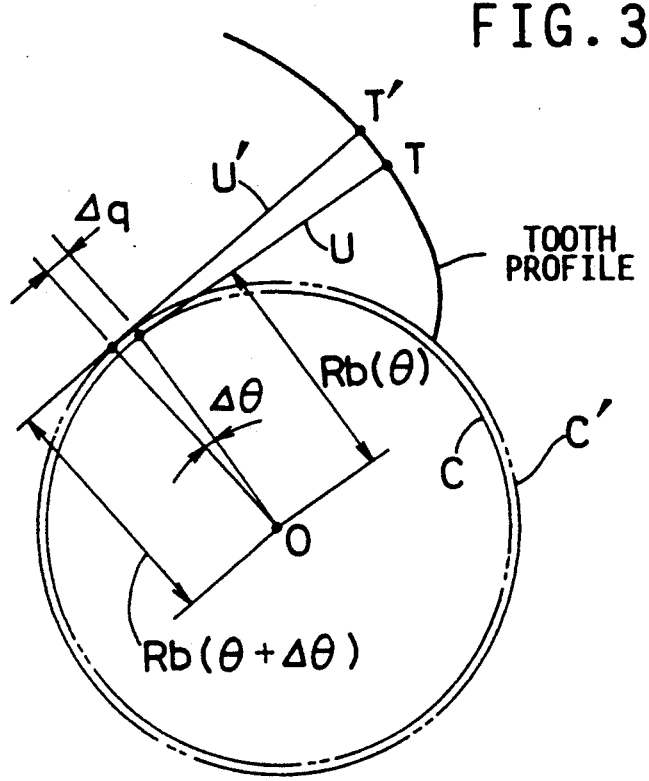
FIG. 3 is a view also for explaining the principle of the gear motion characteristic evaluating method according to the invention.
Figure 4:
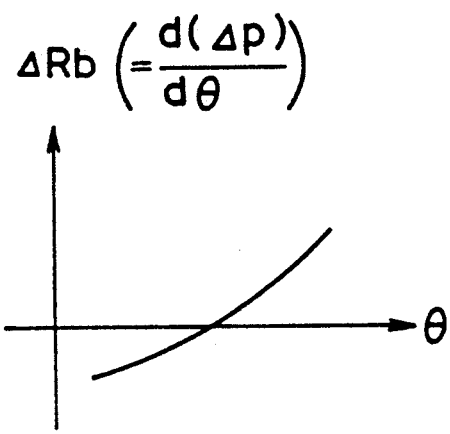
FIG. 4 is a graph indicating an example of a base circle radius error $\Delta Rb$ obtained by differentiating the tooth profile deflection according to this invention.
Figure 5:
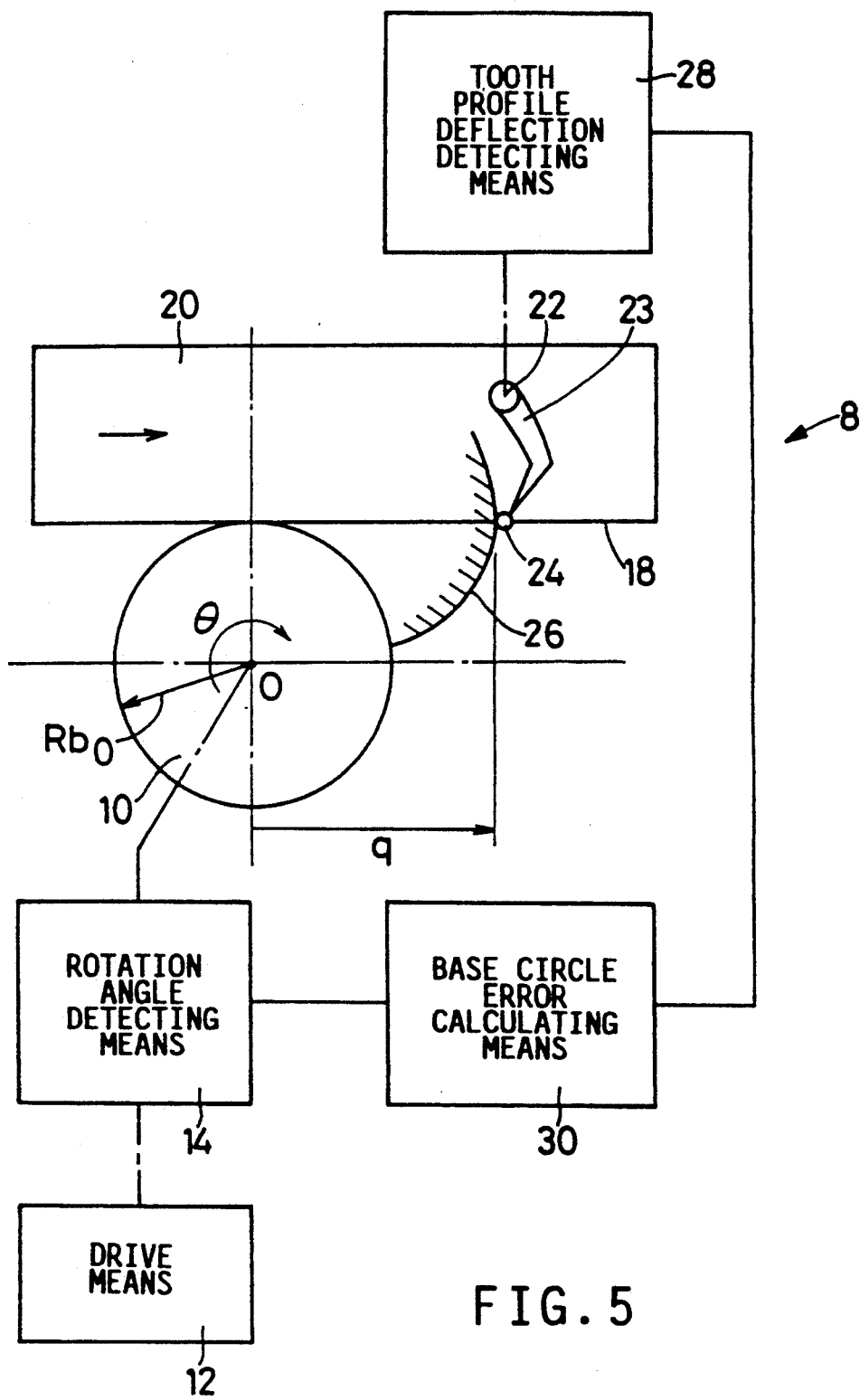
FIG. 5 is a schematic view illustrating a single-gear type tooth profile deflection measuring apparatus adapted to practice the evaluating method according to one embodiment of this invention.

Referring to FIG. 5, there is shown an apparatus 8 (hereinafter referred to as "measuring apparatus") for measuring an amount of tooth profile deflection of a gear, according to one embodiment of this invention for evaluating motion characteristics of the gear.

The measuring apparatus 8 uses a base circle disk 10 which is supported rotatably about a fixed axis. The disk 10 has a diameter which is equal to that of an ideal base circle of an involute spur gear (hereinafter referred to as "workpiece gear"). The measuring apparatus 8 has drive means 12 including a drive motor for rotating the base circle disk 10. The angle0 of rotation of the base circle disk 10 is detected by rotation angle detecting means 14 which includes a rotary encoder well known in the art. The measuring apparatus 8 further includes a straightedge bar 20 having a flat side surface or straightedge 18. The straightedge bar 20 is supported so as to be freely movable along a straight line, such that the flat side surface 18 is held in rolling contact with a cylindrical surface of the base circle disk 10.

On the straightedge bar 20, there is fixed a pin 22 extending perpendicularly to a plane in which the disk 10 is rotated. This pin 22 rotatably supports a measuring member in the form of a pivotal arm 23 such that the pivotal arm 23 is pivotable at its fixed end about the pin 22, in a plane parallel to the plane of rotation of the disk 10. The pivotal arm 23 carries a contact element in the form of a contact ball 24 fixed at its free end. In this arrangement, the contact ball 24 is movable following the circumference of a circle whose center lies on the axis of the pin 22 and whose radius is equal to the distance between the axis of the pin 22 and the flat surface 18, as measured in the direction perpendicular to the direction of movement of the straightedge bar 20 indicated by arrow in FIG. 5. The workpiece gear is fixed to the disk 10 in coaxial relationship with the disk 10, so that the workpiece gear is rotatable with the disk 10. In operation of the measuring apparatus 8, the straightedge bar 20 is moved with its flat side surface 18 in contact with the cylindrical surface of the disk 10. During a rotary movement of the disk 10 with the linear movement of the straightedge bar 20, the ball 24 is kept in contact with a tooth surface of the workpiece gear, whereby the contact ball 24 describes or follows a tooth profile curve 26. If the workpiece gear had no tooth profile deflection, the tooth profile curve 26 would be an involute profile. In other words, the angle of pivotal movement of the pivotal arm 23 represents an amount of deviation of the ball 24 (tooth profile curve 26) away from the involute profile, which is caused by a given amount of tooth profile deflection $\Delta p$ of the workpiece gear. To detect this tooth profile deflection $\Delta p$, there is provided tooth profile deflection detecting means 28 adapted to obtain the value $\Delta p$ from the detected angle of pivotal movement of the arm 23.

The tooth profile deflection detecting means 28 and the rotation angle detecting means 14 are connected to base circle error calculating means 30, which is adapted to store therein data representative of the amount of the tooth profile deflection $\Delta p$ received from the tooth profile deflection detecting means 28, in relation to data representative of the rotation angle $\theta$ of the base circle disk 10 received from the rotation angle detecting means 14. Based on the stored data $\theta$ and $\Delta p$, the base circle error calculating means 30 calculates a base circle radius error $\Delta Rb$ of the workpiece gear, by differentiating the value $\Delta p$ by the value $\theta$.

The user of the measuring apparatus 8 determines that the quality of the workpiece gear is acceptable, if the calculated base circle radius error $\Delta Rb$ is held within a predetermined range in which the noise level of the workpiece gear when actually used in mesh with a mating gear is considered to be lower than a predetermined upper limit. This determination may be automated by suitable data processing means connected to the base circle error calculating means 30.

In the embodiment of FIG. 5, the pivotal arm 23 is used as the measuring member of the apparatus 8. For more accurate measurement of the base circle radius error $\Delta Rb$ of the workpiece gear, it is desirable that the measuring member have a knife edge as the contact element, which is adapted to be linearly movable parallel to the flat side surface 18 of the straightedge bar 20, while the knife edge maintains its attitude perpendicular to the flat side surface 18. In this modified arrangement, the tooth profile deflection of the workpiece gear is more accurately represented by a movement of the contact element parallel to the normal with respect to the tooth profile curve 26, at every instantaneous point on the curve 26.

Figure 6:
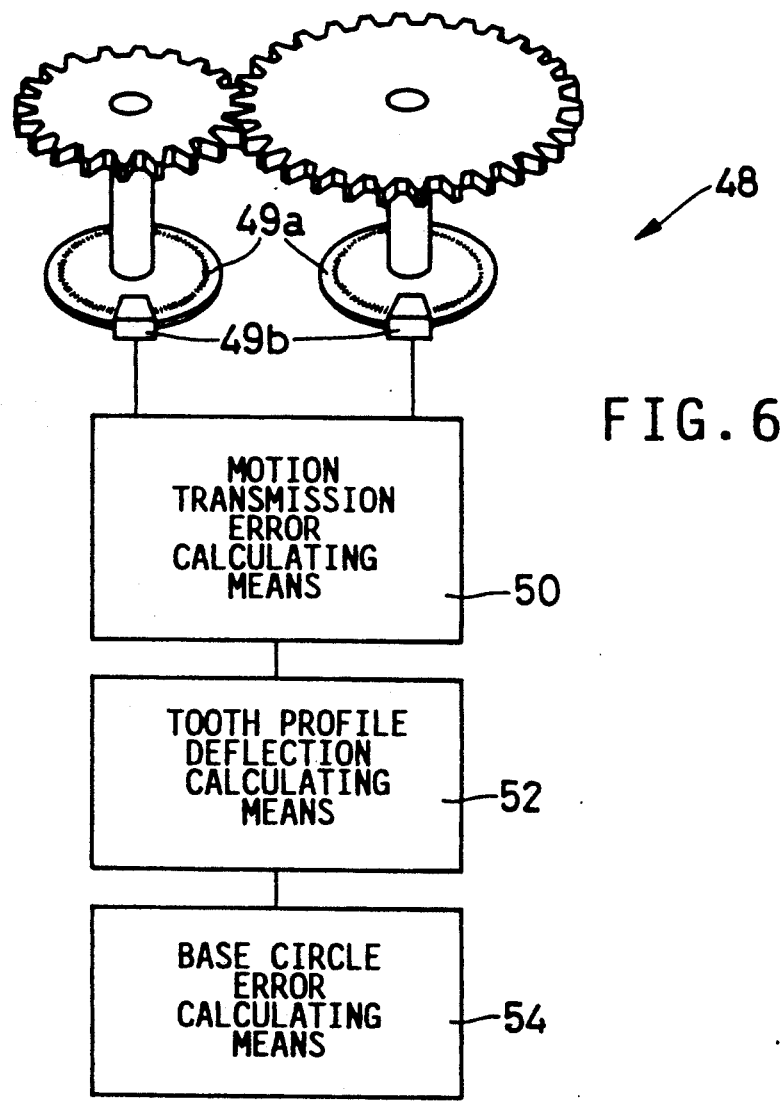
FIG. 6 is a view illustrating a meshing gear pair type tooth profile deflection measuring apparatus adapted to practice the evaluating method according to another embodiment of the invention.

Referring next to FIG. 6, there is shown another embodiment of this invention, which uses a meshing gear pair type of tooth profile deflection measuring apparatus 48. This measuring apparatus 48 is adapted to rotate two involute spur gears in a single flank meshing fashion, at a relatively low velocity, under a non-load condition. One of the two gears is a driving gear positively driven by suitable drive means, while the other gear is a driven gear rotated by the driving gear. The driven gear is the workpiece gear whose tooth profile deflection is measured by the apparatus 48. The two gears are provided with respective rotary disks 49a, and respective optical reading heads 49b adapted to detect rotating angles $\theta$ of the disks 49a. These reading heads 49b are connected to motion transmission error calculating means 50 for calculating a rotary motion transmission error of the driven gear in relation to the rotation angle $\theta$ of the driven gear. This motion transmission error calculating means 50 is constructed as known in the art. The measuring apparatus 48 further includes tooth profile deflection calculating means 52 for calculating the amount of the tooth profile deflection $\Delta p$ from the rotary motion transmission error of the driven gear which is obtained by the calculating means 50. The measuring apparatus 48 also includes base circle error calculating means 54 connected to the calculating means 52. The calculating means 54 is adapted to calculate the base circle radius error $\Delta Rb$, by differentiating the received tooth profile deflection $\Delta p$ of the driven gear by the rotation angle $\theta$ of the driven gear.

There will be described more specifically the manner in which the calculating means 52 calculates the amount of the tooth profile deflection $\Delta p$ from the rotary motion transmission error of the driven gear which is obtained by the calculating means 50.

The pair of gears to be evaluated are converted into equivalent first and second gears, respectively. The first gear is a driving gear having no tooth profile deflection, while the second gear is a driven gear having a resultant value of the actual tooth profile deflections of the gear pair. Assuming that the second gear is rotated by an infinitesimal angle of $\Delta \theta_2$ when the first gear is rotated by an infinitesimal angle of $\Delta \theta_1$, the following equation is established:

$$Rb_{10} \cdot \Delta\theta_1 = Rb_2(\theta_2) \cdot \Delta\theta_2$$

where,
$Rb_{10}$: radius of ideal base circle of the first gear.
$Rb_2(\theta_2)$: radius of instantaneous base circle of the second gear, at the rotation angle $\theta_2$.

Since the instantaneous base circle radius $Rb_2(\theta_2)$ of the second gear is a sum of an ideal base circle radius $\Delta Rb_{20}$, and the instantaneous base circle radius error $\Delta Rb_2(\theta_2)$, the following equation is obtained by integrating the above equation:

$$Rb_{10} \cdot \theta_1 = Rb_{20} \cdot \theta_2 + \int \Delta Rb_2(\theta_2) d\theta_2$$

where, $\theta_2 = 0$ when $\theta_1 = 0$.

Since the second term $\Delta Rb_2(\theta_2)$ in the right member of the above equation is equal to $d(\Delta p(\theta_2))/d\theta_2$ as indicated above, the above equation can be converted into the following equation:

$$Rb_{10} \cdot \theta_1 = Rb_{20}\theta_2 + \Delta p(\theta_2)$$

On the other hand, the ideal angle of rotation (actual rotation angle $\theta_2$ + rotary motion transmission error $\Delta\theta_2 k$) of the second gear produced by rotation of the first gear by the angle $\theta_1$ should be equal to a sum of the rotation angle $\theta_2$ and the rotary motion transmission error $\Delta\theta_2 k$. Accordingly, the following equation is established.

$$Rb_{10} \cdot \theta_1 = Rb_{20} \cdot [\theta_2 - \Delta\theta_2 k]$$

Therefore, the rotary motion transmission error $\Delta\theta_2 k$ can be obtained as follows:

$$\Delta\theta_2 k = \Delta p(\theta_2)/Rb_{20}$$

Based on the above facts, the tooth profile deflection calculating means 52 calculates the tooth profile deflection amount $\Delta p(\theta_2)$ of the second or driven gear for every instantaneous rotation angle $\theta_2$, by multiplying the rotary motion transmission error $\Delta\theta_2 k(\theta_2)$ between the first and second gears, by the radius $Rb_{20}$ of the ideal base circle of the driven gear.

Figure 7:
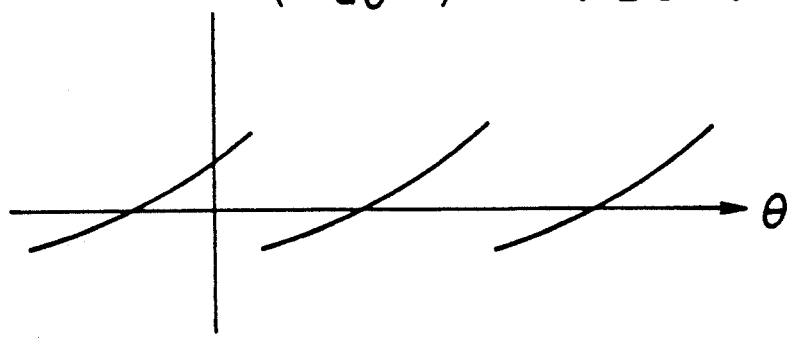
FIG. 7 is a graph showing an example of the base circle radius error $\Delta Rb$ obtained by the method of FIG. 6.

An example of the base circle radius error $\Delta Rb$ calculated by the base circle error calculating means 54 is illustrated in the graph of FIG. 7. The user of the measuring apparatus 48 determines that the relevant gear pair is acceptable with the meshing noise level being sufficiently low, if the base circle radius error $\Delta Rb$ falls within a predetermined range. This determination may also be automated.

In the second embodiment of FIG. 6, the base circle radius error $\Delta Rb$ can be obtained continuously for two or more pairs of teeth of the gear pair, whereby the motion characteristics of the gear pair can be efficiently evaluated in a relatively short time.

In the first embodiment of FIG. 5, a workpiece gear is evaluated by calculating the tooth profile deflection amount $\Delta p$, without meshing with the mating gear. In the second embodiment of FIG. 6, on the other hand, two gears are evaluated by calculating the tooth profile deflection amount $\Delta p$, while they are rotated in mesh with each other at a relatively low velocity, under a non-load condition. However, the present invention may be otherwise embodied.

For example, in the meshing gear pair type, the tooth profile deflection amount $\Delta p$ may be obtained while a pair of involute spur gears or other types of gears are rotated at a relatively low velocity, under a certain amount of load which is smaller than the load which is expected to be actually applied to the gear pair. This modified meshing gear pair type arrangement includes means for or steps of: obtaining the base circle radius error $\Delta Rb(\theta_2)$ and a differentiated value $\Delta Rb'(\theta_2)$ of this base circle radius error $\Delta Rb(\theta_2)$, according to the obtained tooth profile deflection amount $\Delta p$; calculating a load variation $Fd(\theta_2)$ according to the equation given above in the BACKGROUND OF THE INVENTION, based on the values $\Delta Rb(\theta_2)$ and $\Delta Rb'(\theta_2)$, as well as the mean angular velocity $\omega_{20}$ of the second gear under the actual operating condition of use of the gear pair. The motion characteristics of the gear pair can be evaluated from the load variation $Fd(\theta_2)$.

In the modified embodiment described just above, the tooth profile deflection $\Delta p$ is measured while the two gears are rotated at a relatively low velocity and under a relatively light load condition. The measured tooth profile deflection $\Delta P$ is used to obtain the load variation $Fd$, without taking into account an impact force which occurs at the meshing tooth surfaces, since the impact force is extremely small. Although the load variation $Fd$ obtained according to this arrangement can be used to evaluate the motion characteristics of the gear pair, the accuracy of evaluation can be further improved if the load applied to the gear pair during measurement of the tooth profile deflection $\Delta p$ is almost equal to the load which is expected to be applied to the gear pair during actual use.

There will be described a further modified embodiment of this invention for further improvement of the evaluation accuracy of the gear pair, by reference to FIG. 8 which schematically shows a signal processing portion (principally consisting of a computer) of the instant measuring apparatus. Since this modified embodiment is similar to that of FIGS. 6 and 7, the description of the modified embodiment is limited to those parts of this embodiment which differ from the embodiment of FIGS. 6 and 7.

The measuring apparatus according to the present mofidied embodiment includes the motion transmission error calculating means 60, tooth profile deflection calculating means 62 and base circle error calculating means 64, as provided in the apparatus of FIG. 6. The present apparatus is adapted to evaluate involute helical gear pair, by evaluating the tooth profile deflection $\Delta p$ while the two gears are rotated in a single flank meshing fashion, at a relatively low velocity, but under substantially the same amount of load as actually applied to the gear pair during use.

In this modified embodiment, too, it is assumed that the driving helical gear has no tooth profile deflection, while the driven helical gear has a resultant value of the actual tooth profile deflections of the driven and driving gears. As indicated above with respect to the embodiment of FIG. 6, the two helical gears can also be converted into equivalent two spur gears which are capable of transmitting a rotary motion identical with that of the helical gears. Namely, the equivalent spur gears have tooth profiles which are capable of transmitting the same rotational motion as those of the helical gears. That is, the driving gear helical gear is a first gear having no tooth profile deflection, while the driven helical gear is a second gear having a resultant value of the actual tooth profile deflections of the helical gear pair.

The equivalent tooth profiles of the second gear may include: profiles whose base circle radius error $\Delta Rb_2(\theta_2)$ remains equal to a base circle variation coefficient $a_0$ irrespective of the rotation angle ($\theta_2$); convex profiles; and concave profiles. The base circle radius error $\Delta Rb_2(\theta_2)$ of the convex profiles is equal to a product of the rotating angle ($\theta_2$) and a primary base circle variation coefficient $a_1$ which is equal to or larger than 0 ($a_1 \geq 0$), while the base circle radius error $\Delta Rb_2(\theta_2)$ of the concave profiles is equal to a product of the rotating angle ($\theta_2$) and a primary base circle variation coefficient $a_1$ which is smaller than 0 ($a_1 < 0$). Of these tooth profiles, symmetrical convex curve profiles are most important from a practical point of view. In this embodiment, the tooth profiles of the specimen helical gear pair are assumed to be converted into equivalent symmetrical convex profiles of the equivalent spur gears.

The coefficients $a_0$ and $a_1$ indicated above are those which are obtained if it is assumed that the base circle radius error $\Delta Rb_2(\theta_2)$ can be approximated by a polynominal of ($\theta_2$) expressed as a $a_0 a_1 \cdot \theta_2 + a_2 \cdot \theta_2^2 + \ldots$ It is also assumed that the two helical gears are rotated in a steady state, with each tooth of the gear pair passing a single-meshing zone, a first impact zone, a double-meshing zone and a second impact zone, one after another, which make one pitch of rotary movement of the gear pair. Namely, the contact ratio of the gear pair is smaller than 2. If the contact ratio is 2 or larger and smaller than 3, each tooth passes a double-meshing zone, a first impact zone, a triple-meshing zone and a second impact zone. If the contact ratio is 3 or larger and smaller than 4, each tooth passes a triple-meshing zone, a first impact zone, a quadruple zone and a second impact zone.

The load variation Fdx in the single-meshing zone of the equivalent gear pair is represented by the following equation:

$$Fdx = M \cdot [T_2 \cdot \Delta Rbx(\theta_2)/J_2 - \Delta Rbx'(\theta_2) \cdot \omega_{20}^2]$$

where,
$\Delta Rbx(\theta_2)$: base circle radius error $\Delta Rb_2(\theta_2)$ in the single-meshing zone,
$\Delta Rbx'(\theta_2)$: differentiated value of $\Delta Rbx(\theta_2)$.

Similarly, the load variation Fdy in the double-meshing zone is represented by the following equation:

$$Fdy = M \cdot [T_2 \cdot \Delta Rby(\theta_2)/J_2 - \Delta Rby'(\theta_2) \cdot \omega_{20}^2]$$

where, $\Delta Rby(\theta_2)$: base circle radius error $\Delta Rb_2(\theta_2)$ in the double-meshing zone,
$\Delta Rby'(\theta_2)$: differentiated value of $\Delta Rby(\theta_2)$.

Each impact zone is a zone between the two adjacent tooth meshing zones, in which the path of contact is not continuous. In the impact zone, therefore, the angular velocity of the equivalent gears is not continuous, whereby an impact force Fds or Fde is generated at the meshing tooth surfaces. The impact force Fds, Fde can be calculated from a difference between the angular velocities before and after the relevant impact zone (first or second impact zone).

Accordingly, the load variation Fd during one pitch of the rotary movement of the gear pair is represented by the following equations:

$$\begin{aligned}
Fd &= Fdx \text{ (in the single-meshing zone)} \\
&= Fds \text{ (in the first impact zone)} \\
&= Fdy \text{ (in the double-meshing zone)} \\
&= Fde \text{ (in the second impact zone)}
\end{aligned}$$

Based on the above assumptions, an amplitude Fdn of the load variation Fd is obtained by Fourier series, as follows:

$$Fdn = 2 \cdot M \cdot SQRT([\omega_{20}^2 \cdot Un]^2 + [[T_2 \cdot \theta_{2p}/J_2] \cdot Vn]^2)$$

where,
$\theta_{2p}$: half of angular pitch of the second gear, $$Un = [[a_1x - a_1y] \cdot \zeta + a_1y] \cdot \cos(n \cdot \pi \cdot \zeta) -$$

$$[[a_1x - a_1y]/[n \cdot \pi]] \cdot \sin(n \cdot \pi \cdot \zeta),$$

$$Vn = [1/[n \cdot \pi]] \cdot [[a_1y - a_1x] \cdot \zeta - a_1y] \cdot \cos(n \cdot \pi \cdot \zeta) +$$

$$[[a_1y - a_1x] \cdot [\zeta^2/3 - 1/[n^2 \cdot \pi^2] +$$

$$a_1y \cdot [1 - 2 \cdot \zeta]/3] \cdot \sin(n \cdot \pi \cdot \zeta)$$

where,
$a_1x$: primary base circle variation coefficient for the single-meshing zone of the first gear,
$a_1y$: primary base circle variation coefficient for the double-meshing zone of the first gear,
$\zeta$: ratio of the single-meshing zone to one pitch of the gear pair.

Figure 8:
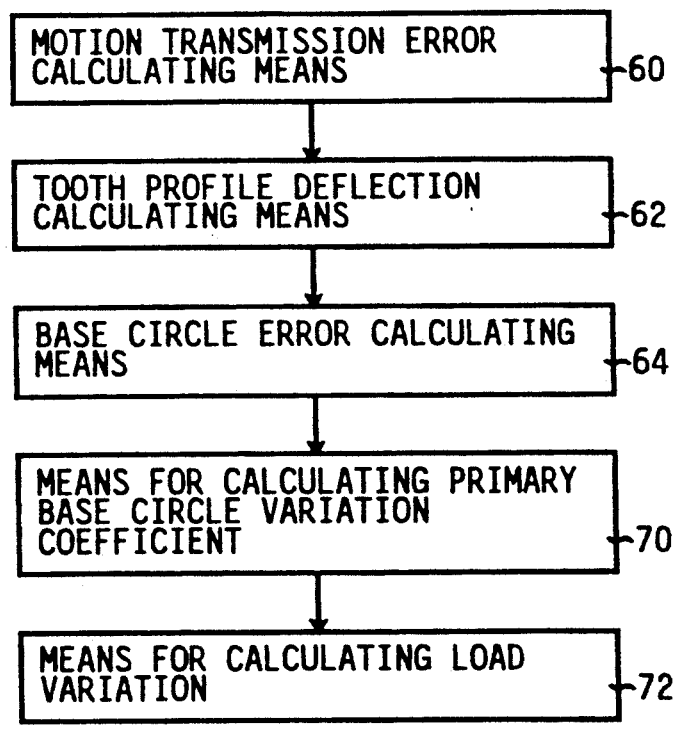
FIG. 8 is a block diagram illustrating a meshing gear pair type tooth profile deflection measuring apparatus according to a further embodiment of the present invention.

In the present embodiment illustrated in the schematic block diagram of FIG. 8, the rotary motion transmission error $\theta_{2k}$ is first calculated by the motion transmission error calculating means 60, for every instantaneous rotation angle ($\theta_2$), and the tooth profile deflection $\Delta p$ is then calculated from the calculated transmission error, by the tooth profile deflection calculating means 62. Subsequently, the base circle error calculating means 64 is operated to calculate the base circle radius error $\Delta Rb_2$, by differentiating the calculated tooth profile deflection $\Delta p$ by the rotation angle ($\theta_2$). Then, means 70 is operated to calculate the primary base circle variation coefficient $a_1x$ at the single-meshing zone, by differentiating the base circle radius error $\Delta Rbx$ at the single-meshing zone by the rotation angle ($\theta_2$). Similarly, the means 70 calculates the primary base circle variation coefficient $a_1y$ at the double-meshing zone, by differentiating the base circle radius error $\Delta ARby$ at the single-meshing zone by the rotation angle ($\theta_2$). The calculation by the means 70 is based on the assumption that the tooth profiles of the helical gears can be converted into equivalent symmetrical convex profiles, for which the base circle radius error $\Delta Rb_2(\theta_2)$ is equal to a product of the primary base circle variation coefficient $a_1$ and the rotation angle ($\theta_2$). Finally, means 72 is operated to calculate the amplitude Fdn of the load variation Fd, according to the above equation, based on the calculated coefficients $a_1x$ and $a_1y$ as well as the value M and other parameters. The user of the apparatus of FIG. 8 determines that the specimen helical gear pair is acceptable with its noise level being sufficiently low, if the calculated load variation amplitude Fdn is within a predetermined range. This determination may also be automated.

In the present embodiment of FIG. 8, the amplitude Fdn of the load variation Fd is calculated by taking into account an impact force which arises on the gear pair for each passage of the gear tooth from one zone to another. Further, since the load expected to be actually applied to the gear pair is applied to the gear pair, the profile of each tooth of the gears during the measurement is almost the same as the tooth profile in the actual use of the gear pair, whereby the calculated load variation amplitude Fdn accurately represents the actual load variation amplitude.

In the embodiment of FIG. 8, the tooth profile deflection $\Delta p$ is measured while the two gears are rotated at a relatively low velocity under substantially the same load condition as in the actual use of the gear pair, so that the load variation amplitude Fdn can be accurately calculated based on the thus measured tooth profile deflection. However, the actual load variation amplitude Fdn can be accurately estimated, based on the tooth profile deflection $\Delta p$ measured during rotation of the gear pair at a relatively low velocity and under a non-load condition, if the measured tooth profile deflection $\Delta p$ is compensated for an estimated amount of influence of the variation or deviation of the tooth profile under the actual load condition, from the nominal tooth profile under the non-load condition, which deviation occurs due to elastic deformation of the gear teeth. An example of this modified arrangement will be described referring to FIG. 9, which schematically shows a signal processing portion (principally consisting of a computer) of the measuring apparatus. Since this modified arrangement is more or less similar to the embodiment of FIG. 8, only those parts of the arrangement different from the embodiment of FIG. 8 will be described.

As described below in detail, the measuring apparatus of FIG. 9 includes motion transmission error calculating means 100, means 102 for calculating non-load tooth profile deflection under no load, means 104 for calculating under-load tooth profile deflection under load, base circle error calculating means 106, means 108 for calculating primary base circle variation coefficient, and load variation calculating means 110.

Figure 9:
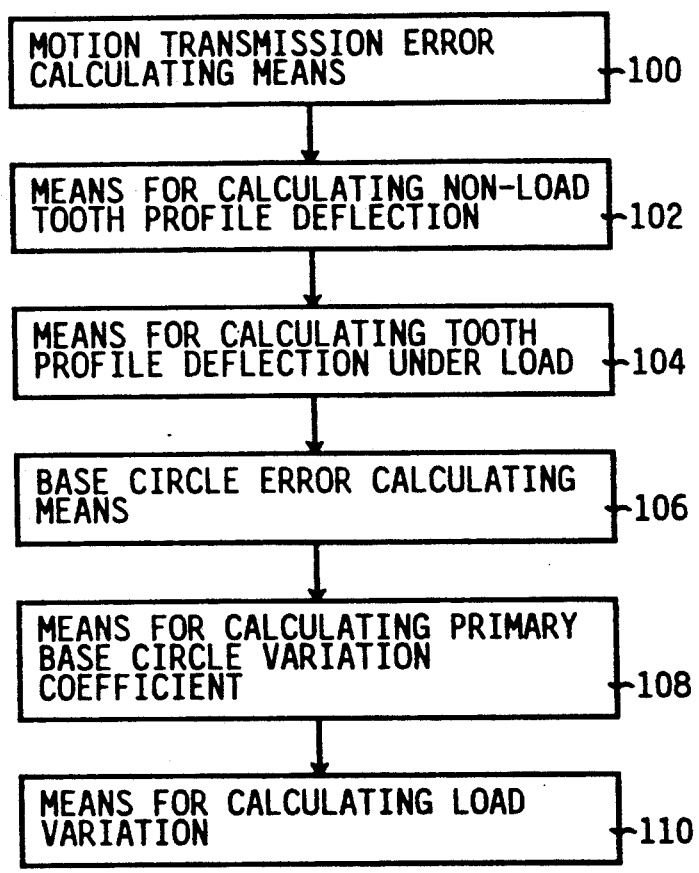
FIG. 9 is a block diagram illustrating a meshing gear pair type tooth profile deflecting measuring apparatus according to a still further embodiment of this invention.

In the embodiment of FIG. 9, too, it is assumed that the first gear having no tooth profile deflection and the second gear having a tooth profile deflection have symmetrical convex profiles. Namely, it is assumed that the base circle radius error $\Delta Rb_2(\theta_2)$ under the load condition of the second gear can be approximated as $a_1 \cdot \theta_2$.

It is also assumed that the first gear is a rigid gear while the second gear is an elastic gear. That is, it is assumed that only the second gear undergoes static tooth deflection Xs due to elastic deformation under a load condition, and that the static tooth deflection Xs can be approximated as $Fs/K(\theta_2)$, where Fs represents the static load acting on the tooth surface under the static condition, while $K(\theta_2)$ represents a spring constant of the gear pair. This spring $K(\theta_2)$ constant can be approximated as:

$$Kp \cdot exp(-Cp \cdot |\theta_2^3|)$$

where, Kp and Cp are constants determined by the specifications of the gear pair.

On the above assumptions, the tooth profile deflection $\Delta px(\theta_2)$ in the single-meshing zone of the second gear under load (hereinafter referred to as "under-load tooth profile deflection $\Delta px(\theta_2)$") is represented by the following equation:

$$\Delta px(\theta_2) = \Delta p(\theta_2) - Xs(\theta_2)$$

where, $\Delta p(\theta_2)$ represents the tooth profile deflection under non-load condition (hereinafter referred to as "non-load tooth profile deflection $\Delta p(\theta_2)$").

The non-load tooth profile deflection $\Delta p(\theta_2)$ is equal to that measured by the meshing gear pair type measuring apparatus 48 of FIG. 6, while the static tooth deflection $Xs(\theta_2)$ can be obtained from the following equations, which have been indicated above.

$$Xs(\theta_2) = Fs/K(\theta_2)$$

$$K(\theta_2) = Kp \cdot exp(-Cp \cdot |\theta_2^3|)$$

Therefore, the under-load tooth profile deflection $\Delta pxs(\theta_2)$ can be calculated based on the non-load tooth profile deflection $\Delta p(\theta_2)$, static load Fs and spring constant $K(\theta_2)$.

On the other hand, the relationship between the under-load tooth profile deflection $\Delta px(\theta_2)$ and the base circle radius error $\Delta Rbx(\theta_2)$ at the single-meshing zone of the second gear is represented by the following equation, as indicated above.

$$d(\Delta px(\theta_2))/d\theta_2 = \Delta Rbx(\theta_2)$$

Further, the relationship between the base circle radius error $\Delta Rbx(\theta_2)$ and the primary base circle variation coefficient $a_1x$ is represented by the following equation:

$$\Delta Rbx(\theta_2) = a_1x \cdot \theta_2$$

Therefore, the primary base circle variation coefficient $a_1x$ can be calculated from the non-load tooth profile deflection $\Delta p(\theta_2)$.

While the theory of calculating the primary base circle variation coefficient $a_1x$ at the single-meshing zone of the second gear under the load condition has been explained above, there will be described the theory of calculating the primary base circle variation coefficient $a_1y$ at the double-meshing zone of the second gear under the load condition.

In the double-meshing zone, the second gear meshes with the first gear, not only at one tooth thereof (corresponding to rotation angle $\theta_2$) in the single-meshing zone, but also at another tooth thereof [corresponding to (rotation angle $\theta_2 - 2$·angular pitch half value $\theta_2p$)] which is one pitch adjacent to that one tooth. Unlike the primary base circle variation coefficient $a_1x$ for the single-meshing zone, the primary base circle variation coefficient $a_1y$ for the double-meshing zone should be calculated by taking account not only the profile deflection and static deflection of the tooth in the single-meshing zone, but also the profile deflection and static deflection of the adjacent tooth.

When the one tooth of the second gear passes from the single-meshing zone to the double-meshing zone, a portion of the load which has acted on that tooth is transferred to the adjacent tooth. Assuming that a tooth profile deflection of the tooth in the double-meshing zone under the load-condition is represented by $\Delta py$, the amount of reduction in the load acting on the above-indicated one tooth is represented by $K(\theta_2)\cdot[-\Delta px(\theta_2) + \Delta py(\theta_2)]$, while the amount of load transferred from that tooth to the adjacent tooth is represented by $K(\theta_2 - 2\cdot\theta_2p)\cdot[-\Delta py(\theta_2) + \Delta p(\theta_2 - 2\cdot\theta_2p)]$. Since the load reduction amount $K(\theta_2)\cdot[-\Delta px(\theta_2) + \Delta py(\theta_2)]$ is equal to the transferred load amount $K(\theta_2 - 2\cdot\theta_2p)\cdot[-\Delta py(\theta_2) + \Delta p(\theta_2 - 2\cdot\theta_2p)]$, the tooth profile deflection $\Delta py$ is obtained as:

$$[K(\theta_2 - 2\cdot\theta_2p)\cdot\Delta p(\theta_2 - 2\cdot\theta_2p) + K(\theta_2)\cdot\Delta px(\theta_2)]/[K(-\theta_2 - 2\cdot\theta_2p) + K(\theta_2)]$$

On the other hand, the relationship between the under-load tooth profile deflection $\Delta py(\theta_2)$ and the base circle radius error $\Delta Rby(\theta_2)$ at the double-meshing zone of the second gear is represented by the following equation:

$$d(\Delta py(\theta_2))/d\theta_2 = \Delta Rby(\theta_2)$$

Further, the relationship between the base circle radius error $\Delta Rby(\theta_2)$ and the primary base circle variation coefficient $a_1y$ is represented by the following equation:

$$\Delta Rby(\theta_2) = a_1y\cdot\theta_2$$

Therefore, the primary base circle variation coefficient $a_1y$ can be calculated from the under-load tooth profile deflection $\Delta p(\theta_2)$ in the single-meshing zone, and the non-load tooth profile deflection $\Delta p(\theta_2 - 2\cdot\theta_2p)$ of the next adjacent tooth.

By inserting the thus calculated primary base circle variation coefficients $a_1x$, $a_1y$ in the following equation, the amplitude Fdn of the load variation Fd can be calculated.

$$Fdn = 2\cdot M\cdot SQRT([\omega_{20}\cdot Un]^2 - [[T_2\cdot\theta_2p/J_2]\cdot Vn]^2)$$

In the present embodiment illustrated in the schematic block diagram of FIG. 9, the rotary motion transmission error $\Delta\theta_2k$ of the helical gear pair is first calculated by the motion transmission error calculating means 100, for every instantaneous rotation angle $\theta_2$, and the non-load tooth profile deflection $\Delta p(\theta_2)$ is then calculated from the calculated rotary motion transmission error $\Delta\theta_2k$, by the non-load tooth profile deflection calculating means 102.

Subsequently, the under-load tooth profile deflection calculating means 104 is activated to calculate the under-load tooth profile deflection $\Delta px(\theta_2)$ at the single-meshing zone, for every instantaneous rotation angle $\theta_2$, based on the calculated non-load tooth profile deflection $\Delta p(\theta_2)$, and according to the relationships described above.

Then, the base circle error calculating means 106 is operated to calculate the base circle radius error $\Delta Rbx(\theta_2)$, by differentiating the calculated under-load tooth profile deflection $\Delta px(\theta_2)$ by the rotation angle $\theta_2$. The means 108 is then operated to calculate the primary base circle variation coefficient $a_1x$ at the single-meshing zone, by differentiating the base circle radius error $\Delta Rbx$ at the single-meshing zone by the rotation angle $\theta_2$.

While the manner of calculating the primary base circle variation coefficient $a_1y$ at the single-meshing zone has been described above, the primary base circle variation coefficient $a_1y$ at the double-meshing zone can be similarly calculated. Initially, the under-load tooth profile deflection calculating means 104 is operated to calculate the under-load tooth profile deflection $\Delta py(\theta_2)$, based on the calculated under-load tooth profile deflection $\Delta px(\theta_2)$ at the single-meshing zone and on the non-load tooth profile deflection $\Delta p(\theta_2 - 2\cdot\theta_2p)$ at the double-meshing zone, and according to the above-described relationships. Then, the base circle error calculating means 106 is operated to calculate the primary base circle variation coefficient $a_1y$ by differentiating the base circle radius error $\Delta Rby(\theta_2)$ by the rotation angle $\theta_2$.

After the primary base circle variation coefficients $a_1x$, $a_1y$ have been calculated, the load variation calculating means 110 is operated to calculate the amplitude Fdn of the load variation Fd, according to the above equation for calculating the load variation amplitude Fdn, based on the calculated coefficients $a_1x$, $a_1y$ as well as the value M and other parameters.

The user of the measuring apparatus of FIG. 9 determines that the specimen helical gear pair is acceptable with its noise level being sufficiently low, if the calculated load variation amplitude Fdn is within a predetermined range. This determination may also be automated.

Thus, the embodiment of FIG. 9 is adapted to accurately estimate the load variation amplitude Fdn under the actual load condition, by using the non-load tooth profile deflection measured during rotation of the gear pair under non-load condition.

As described above with respect to the several different embodiments of the meshing gear pair type measuring apparatus according to this invention, the tooth profile deflection is obtained from the rotary motion transmission error, and the motion characteristics of the gear pair are evaluated by differentiating the tooth profile deflection by the rotation angle of the gear pair. The meshing gear pair type arrangements are particularly effective for involute helical gears, non-involute cylindrical gears, bevel gears, hypoid gears, and other types of gears which cannot be easily or accurately evaluated of the motion characteristics by the base circle disk type measuring apparatus 8 shown in FIG. 5.

While the present invention has been described above in its presently preferred embodiments, it is to be understood that the invention may be embodied with various changes, modifications and improvements, which may occur to those skilled in the art, without departing from the spirit and scope of the invention defined in the following claims.

What is claimed is:

1. A method of evaluating motion characteristics of a workpiece gear, comprising steps of:

obtaining an amount of tooth profile deflection of said workpiece gear in a direction substantially perpendicular to a surface of each tooth of the gear, in relation to an angle of rotation of the gear;

obtaining a differentiated value of said amount of tooth profile deflection, by differentiating said amount of tooth profile deflection by said angle of rotation; and evaluating the motion characteristics of said workpiece gear in terms of at least one of vibration and noise of said workpiece gear, based on said differentiated value.

2. A method according to claim 1, wherein said step of obtaining a differentiated value comprises obtaining at least one of a first derivative and a second derivative of said amount of tooth profile deflection with respect to said angle of rotation.

3. A method of evaluating motion characteristics of a workpiece gear, comprising:

obtaining an amount of tooth profile deflection of said workpiece gear in a direction substantially perpendicular to a surface of each tooth of the gear, in relation to an angle of rotation of the gear;

obtaining a differentiated value of said amount of tooth profile deflection, by differentiating said amount of tooth profile deflection by said angle of rotation;

obtaining a variation in a load acting on the surface of each tooth of said workpiece gear during rotation thereof, based on said differentiated value of said amount of tooth profile deflection; and evaluating said motion characteristics based on said variation in said load.

4. A method of evaluating motion characteristics of a workpiece gear, comprising:

obtaining an amount of tooth profile deflection of said workpiece gear in a direction substantially perpendicular to a surface of each tooth of the gear, in relation to an angle of rotation of the gear, including operating a device having a base circle disk that rotates coaxially with said workpiece gear and has a diameter equal to a base circle of said workpiece gear, a substantially linearly movable member, said member being linearly movable with a rotary motion of said base circle disk and said workpiece gear, and a measuring member which is supported by said substantially linearly movable member, for engagement with the tooth surface of said workpiece gear, such that a movement of said measuring member represents said amount of tooth profile deflection, and obtaining said amount of tooth profile deflection based on said movement of said measuring member;

obtaining a differentiated value of said amount of tooth profile deflection, by differentiating said amount of tooth profile deflection by said angle of rotation; and evaluating the motion characteristics of said workpiece gear, based on said differentiated value.

5. A method according to claim 4, wherein said workpiece gear is an involute gear, and said step of obtaining a differentiated value of said amount of tooth profile deflection comprises differentiating said amount of tooth profile deflection of said involute gear by said angle of rotation of said involute gear, to obtain a base circle radius error which is an error in radius of an instantaneous base circle with respect to an ideal base circle of said involute gear, said instantaneous base circle being defined by a normal with respect to a profile curve of said each tooth of said each involute gear, at every instantaneous point on said profile curve which corresponds to every instantaneous angle of rotation of said each involute gear by which said amount of tooth profile deflection is differentiated, said step of evaluating the motion characteristics comprising evaluating said motion characteristics based on said base circle radius error.

6. A method of evaluating motion characteristics of a workpiece gear, comprising:

obtaining an amount of tooth profile deflection of said workpiece gear in a direction substantially perpendicular to a surface of each tooth of the gear, in relation to an angle of rotation of the gear, including rotating a pair of meshing gears which includes said workpiece gear, detecting angle of rotation of said pair of meshing gears;

obtaining an error of motion transmission between said pair of gears, and obtaining an amount of tooth profile deflection of said pair of meshing gears, based on said error of motion transmission of said meshing gears;

obtaining a differentiated value of said amount of tooth profile deflection, by differentiating said amount of tooth profile deflection by said angle of rotation; and evaluating the motion characteristics of said workpiece gear, based on said differentiated value.

7. A method according to claim 6, wherein said step of obtaining a differentiated value comprises obtaining, as said differentiated value of said amount of tooth profile deflection, a first derivative and a second derivative of said amount of tooth profile deflection of said meshing gears with respect to said angle of rotation of said meshing gears, said step of evaluating the motion characteristics comprising calculating a variation in a load acting on the surface of each tooth of said workpiece gear during rotation thereof, based on said first and second derivatives.

8. A method according to claim 6, wherein said pair of meshing gears is a pair of meshing involute gears, and said step of obtaining a differentiated value comprises obtaining at least one of a first derivative and a second derivative of said amount of tooth profile deflection of said meshing gears with respect to said angle of rotation of said meshing gears, said first derivative being obtained as a base circle radius error which is an error in radius of an instantaneous base circle with respect to an ideal base circle of each of said involute gears, said instantaneous base circle being defined by a normal with respect to a profile curve of said each tooth of said each involute gear, at every instantaneous point on said profile curve which corresponds to every instantaneous angle of rotation of said each involute gear by which said amount of tooth profile deflection is differentiated, said second derivative being obtained as a differentiated value of said base circle radius error.

9. A method according to claim 8, wherein said step of evaluating the motion characteristics comprises calculating a variation in a load acting on the surface of each tooth of said each involute gear during rotation thereof, based on both of said base circle radius error and said differentiated value of said base circle radius error, and evaluating said motion characteristics of said pair of meshing involute gears based on said variation in said load.

10. A method according to claim 6, wherein said step of evaluating the motion characteristics comprises obtaining a variation in a load acting on the surface of each tooth of said workpiece gear during rotation thereof, based on said differentiated value of said amount of tooth profile deflection, and according to a formula which includes parameters representative of impact forces which arise when the teeth of said meshing gears pass from one meshing zone to another.

11. A method according to claim 10, wherein said pair of meshing gears is a pair of meshing involute gears, and said step of obtaining a differentiated value comprises obtaining a first derivative of said amount of tooth profile deflection of said workpiece gear with respect to said angle of rotation of said meshing involute gears, as a base circle radius error which is an error in radius of an instantaneous base circle with respect to an ideal base circle of each of said involute gears, said instantaneous base circle being defined by a normal with respect to a profile curve of said each tooth of said each involute gear, at every instantaneous point on said profile curve which corresponds to every instantaneous angle of rotation of said each involute gear by which said amount of tooth profile deflection is differentiated, said step of obtaining a differentiated value further comprising obtaining a differentiated value of said base circle radius error by differentiating said base circle radius error by said angle of rotation, said step of evaluating the motion characteristics comprising obtaining said variation in a load, based on said differentiated value of said base circle radius error and according to said formula.

12. A method according to claim 10, wherein said pair of meshing gears is a pair of meshing involute gears, and said step of obtaining a differentiated value comprises obtaining an amount of deflection of the tooth profile of said workpiece gear which is expected to arise due to elastic deformation of said meshing involute gears during rotation under a load condition, and obtaining an amount of under-load tooth profile deflection due to said elastic deformation, by adding the obtained amount of deflection due to said elastic deformation to said amount of tooth profile deflection obtained in relation to said angle of rotation of said workpiece gear under a non-load condition, said step of obtaining a differentiated value further comprising obtaining a first derivative of said under-load tooth profile deflection of said workpiece gear with respect to said angle of rotation of said meshing involute gears, as a base circle radius error which is an error in radius of an instantaneous base circle with respect to an ideal base circle of each of said involute gears, said instantaneous base circle being defined by a normal with respect to a profile curve of said each tooth of said each involute gear, at every instantaneous point on said profile curve which corresponds to every instantaneous angle of rotation of said each involute gear by which said amount of tooth profile deflection is differentiated, said step of obtaining a differentiated value further comprising obtaining a differentiated value of said base circle radius error by differentiating said base circle radius error by said angle of rotation, said step of evaluating the motion characteristics comprising obtaining said variation in a load, based on said differentiated value of said base circle radius error and according to said formula.

13. An apparatus comprising:
tooth profile deflection obtaining means for obtaining an amount of tooth profile deflection of a workpiece gear in a direction substantially perpendicular to a surface of each tooth of the workpiece gear, in relation to an angle of rotation of the workpiece gear;
differentiating means for obtaining a differentiated value of said amount of tooth profile deflection, by differentiating said amount of tooth profile deflection by said angle of rotation; and
means for evaluating motion characteristics of said workpiece gear in accordance with said differentiated value of said amount of tooth profile deflection.

14. An apparatus according to claim 13, wherein said differentiating means comprises means for obtaining, as said differentiated value of said amount of tooth profile deflection, at least one of a first derivative and a second derivative of said amount of tooth profile deflection with respect to said angle of rotation.

15. An apparatus according to claim 13, wherein said means for evaluating motion characteristics of said workpiece gear in accordance with said differentiated value, includes means for calculating the amount of tooth profile defection.

16. An apparatus according to claim 15, wherein said motion characteristic evaluating means includes means for calculating a variation in a load acting on the surface of each tooth of said workpiece gear during rotation thereof, based on said differentiated value of said amount of tooth profile deflection.

17. An apparatus according to claim 15, wherein said motion characteristic evaluating means includes means for evaluating said motion characteristics of said workpiece gear in terms of at least vibration and noise of said workpiece gear.

18. An apparatus according to claim 13, wherein said tooth profile deflection obtaining means comprises means for detecting angles of rotation of a pair of meshing gears which includes said workpiece gear, and motion transmission error obtaining means for obtaining an error of motion transmission between said pair of meshing gears, said tooth profile deflection obtaining means further comprising means for obtaining an amount of tooth profile deflection of said pair of meshing gears in relation to the angle of rotation of said meshing gears, based on said error of motion transmission of said meshing gears.

19. An apparatus according to claim 18, wherein said differentiating means obtains, as said differentiated value of said amount of tooth profile deflection, at least one of a first derivative and a second derivative of said amount of tooth profile deflection of said meshing gears obtained by said tooth profile deflection obtaining means, with respect to said angle of rotation of said meshing gears.

20. An apparatus according to claim 18, wherein said differentiating means obtains a second derivative of said amount of tooth profile deflection of said workpiece gear with respect to said angle of rotation of said meshing involute gears, as said differentiated value of said amount of tooth profile deflection, said apparatus further comprising load variation calculating means for obtaining a variation in a load acting on the surface of each tooth of said workpiece gear during rotation thereof, based on said differentiated value of said amount of tooth profile deflection, and according to a formula which includes parameters representative of impact forces which arise when the teeth of said meshing involute gears pass from one meshing zone to another.

21. An apparatus according to claim 13, wherein said means for evaluating the motion characteristics in accordance with said differentiated value of said amount of tooth profile deflection comprises means for providing an output corresponding to said differentiated value.

22. An apparatus comprising:
tooth profile deflection obtaining means for obtaining an amount of tooth profile deflection of a workpiece gear in a direction substantially perpendicular to a surface of each tooth of the workpiece gear, in relation to an angle of rotation of the workpiece gear;
differentiating means for obtaining a differentiated value of said amount of tooth profile deflection, by differentiating said amount of tooth profile deflection by said angle of rotation; and
evaluating means including load variation calculating means for calculating a variation in a load acting on the surface of said tooth of said workpiece gear during rotation thereof, based on said differentiated value of said amount of tooth profile deflection for evaluating motion characteristics of said workpiece gear.

23. An apparatus comprising:
tooth profile deflection obtaining means for obtaining an amount of tooth profile deflection to a workpiece gear in a direction substantially perpendicular to a surface of each tooth of the workpiece gear, in relation to an angle of rotation of the workpiece gear, including a device having a base circle disk rotatable coaxially with said workpiece gear and having a diameter equal to a base circle of said workpiece gear, a linearly movable member being linearly movable with a rotary motion of said base circle disk and said workpiece gear, a measuring member supported by said linearly movable member for engagement with the tooth surface of said workpiece gear, such that a movement of said measuring member represents said amount of tooth profile deflection, and means for obtaining said amount of tooth profile deflection based on said movement of said measuring member; and
differentiating means for obtaining a differentiated value of said amount of tooth profile deflection, by differentiating said amount of tooth profile deflection by said angle of rotation.

24. An apparatus according to claim 23, wherein said workpiece gear is an involute gear, and said differentiating means differentiates said amount of tooth profile deflection of said involute gear by said angle of rotation of said involute gear, to obtain a base circle radius error which is an error in radius of an instantaneous base circle with respect to an ideal base circle of said involute gear, said instantaneous base circle being defined by a normal with respect to a profile curve of said each tooth of said each involute gear, at every instantaneous point on said profile curve which corresponds to every instantaneous angle of rotation of said each involute gear by which said amount of tooth profile deflection is differentiated, said differentiated value of said amount of tooth profile deflection being obtained as said differentiated value of said amount of tooth profile deflection.

25. An apparatus comprising:
tooth profile deflection obtaining means for obtaining an amount of tooth profile deflection of a workpiece gear in a direction substantially perpendicular to a surface of each tooth of the workpiece gear, in relation to an angle of rotation of the workpiece gear, said tooth profile deflection obtaining means including means for detecting angles of rotation of a pair of involute meshing gears that includes said workpiece gear;
motion transmission error obtaining means for obtaining an error of motion transmission between said pair of meshing gears, means for obtaining an amount of tooth profile deflection of said pair of meshing gears in relation to the angle of rotation of said pair of meshing gears, based on said error of motion transmission of said pair of meshing gears; and
differentiating means for obtaining at least one of a first derivative and a second derivative of said amount of tooth profile deflection of said pair of meshing gears with respect to said angle of rotation, said first derivative being obtained as a base circle radius error, said base circle radius error being an error in radius of an instantaneous base circle with respect to an ideal base circle of each of said pair of involute meshing gears, said instantaneous base circle being defined by a normal with respect to a profile curve of said each tooth of said each involute gear, at every instantaneous point on said profile curve corresponding to every instantaneous angle of rotation of each said pair of involute meshing gears by which said amount of tooth profile deflection is differentiated, said second derivative being obtained as a differentiated value of said base circle radius error.

26. An apparatus according to claim 25, wherein said differentiating means obtains said base circle radius error and said differentiated value of said base circle radius error, as said differentiated value of said amount of tooth profile deflection, said apparatus further comprising load variation calculating means for calculating a variation in a load acting on the surface of each tooth of said each involute gear during rotation thereof, based on both of said base circle radius error and said differentiated value of said base circle radius error.

27. An apparatus comprising:
tooth profile deflection obtaining means for obtaining an amount of tooth profile deflection of a workpiece gear in a direction substantially perpendicular to a surface of each tooth of the workpiece gear, in relation to an angle of rotation of a pair of meshing involute gears, one of said pair being the workpiece gear, said tooth profile deflection obtaining means including, means for detecting angles of rotation of said pair of meshing gears, motion transmission error obtaining means for obtaining an error of motion transmission between said pair of meshing gears, said amount of profile deflection being based on said error of motion transmission of said meshing gears;

differentiating means including means for obtaining a first derivative of said amount of tooth profile deflection of said workpiece gear with respect to said angle of rotation of said meshing involute gears, as a base circle radius error which error is an error in radius of an instantaneous base circle with respect to an ideal base circle of each of said involute gears, said instant base circle being defined by a normal with respect to a profile curve of said each tooth of said each involute gear, at every instantaneous point on said profile curve which corresponds to every instantaneous angle of rotation of said each involute gear by which said amount of tooth profile deflection is differentiated, and means for obtaining a differentiated value of said base circle error by differentiating said base circle radius error by said angle of rotation, said differentiating means including means for obtaining a second derivative of said amount of tooth profile deflection of said workpiece gear with respect to said angle of rotation of meshing involute gears, said second derivative being a differentiated value of said amount of tooth profile deflection; and load variation calculating means for obtaining a variation in a load acting on the surface of each tooth of said workpiece gear during rotation thereof, based on said differentiated value of said base circle radius error, said amount of tooth profile deflection, and according to a formula which includes parameters representative of impact forces which arise when teeth of a pair of meshing involute gears including the workpiece gear pass from one meshing zone to another.

28. An apparatus comprising:

tooth profile deflection obtaining means for obtaining an amount of tooth profile deflection of a workpiece gear in a direction substantially perpendicular to a surface of each tooth of the workpiece gear, in relation to an angle of rotation of the workpiece gear, said tooth profile deflection obtaining means including
  (a) first means for detecting angles of rotation of a pair of meshing involute gears which includes said workpiece gear,
  (b) second means for obtaining an error of motion transmission between said pair of meshing gears,
  (c) third means for obtaining an amount of tooth profile deflection of said pair of meshing gears in relation to the angle of rotation of said meshing gears, based on said error of motion transmission of said meshing gears,
  (d) fourth means for obtaining an amount of non-load tooth profile deflection of said workpiece gear during rotation of said meshing involute gears under a non-load condition, in relation to said angle of rotation of said workpiece gear,
  (e) fifth means for obtaining an amount of deflection of the tooth profile of said workpiece gear which is expected to arise due to elastic deformation of said meshing involute gears during rotation under a load condition, obtaining an amount of under-load tooth profile deflection due to said elastic deformation, by adding the obtained amount of deflection due to said elastic deformation to said amount of tooth profile deflection obtained by said fourth obtaining means;

differentiating means comprising (i) means for obtaining a first derivative of said under-load tooth profile deflection of said workpiece gear with respect to said angle of rotation of said meshing involute gears, as a base circle error which is an error in radius of an instantaneous base circle with respect to an ideal base circle of each of said involute gears, said instantaneous base circle being defined by a normal with respect to a profile curve of said tooth of said each involute gear, at every instantaneous point on said profile curve which corresponds to every instantaneous angle of rotation of said each involute gear by which said amount of tooth profile deflection is differentiated, and (ii) means for obtaining a differentiated value of said base circle radius error by differentiating said base circle radius error by said angle of rotation; and load variation calculating means for calculating a variation in a load acting on the surface of each tooth of said workpiece gear during rotation thereof, said calculated variation in load being based on said differentiated value of said base circle radius error, and according to a formula which includes parameters representative of impact forces which arise when the teeth of said meshing involute gears pass from one meshing zone to another.

* * * * *

UNITED STATES PATENT AND TRADEMARK OFFICE
CERTIFICATE OF CORRECTION

PATENT NO. : 5,231,875
DATED : August 3, 1993
INVENTOR(S) : SHO HONDA

It is certified that error appears in the above-indentified patent and that said Letters Patent is hereby corrected as shown below:

Claim 15, column 18, line 35, "defection" should read --deflection--.

Signed and Sealed this

Twenty-eighth Day of June, 1994

Attest:

BRUCE LEHMAN

*Attesting Officer*    *Commissioner of Patents and Trademarks*